United States Patent [19]

Broadbent

[11] 4,405,041
[45] Sep. 20, 1983

[54] CLUTCH RELEASE MECHANISM FOR A PULL TYPE CLUTCH

[75] Inventor: George T. Broadbent, Chesterfield, England

[73] Assignee: Automotive Products Limited, Leamington Spa, England

[21] Appl. No.: 283,873

[22] Filed: Jul. 16, 1981

[30] Foreign Application Priority Data

Jul. 22, 1980 [GB] United Kingdom ............... 8023908

[51] Int. Cl.³ ............................................. F16D 23/14
[52] U.S. Cl. .................... 192/98; 192/110 B; 192/99 S
[58] Field of Search ............... 192/70.13, 70.27, 89 B, 192/98, 110 B, 110 S, 111 A, 111 R, DIG. 1, 99 S; 308/190, 188; 403/322, 330, 290

[56] References Cited

U.S. PATENT DOCUMENTS 1,968,274 7/1934 Wemp ........................ 192/111 A
2,121,418 9/1938 Barish ........................ 192/110 B
4,228,882 10/1980 Huber et al. ................ 192/89 B X

FOREIGN PATENT DOCUMENTS 1775997 5/1974 Fed. Rep. of Germany ... 192/70.27
681182 8/1979 U.S.S.R. ............................ 403/330

*Primary Examiner*—Rodney H. Bonck
*Assistant Examiner*—James J. Merek
*Attorney, Agent, or Firm*—Kemon & Estabrook

[57] ABSTRACT

A clutch release mechanism for a pull type friction clutch for automobiles having a gearbox with a sleeve surrounding its input shaft. The mechanism comprises a release bearing assembly, a release fork and an automatically connectable and disconnectable coupling operably connecting the release fork to the bearing assembly. The coupling is caused to engage or disengage a shoulder on the bearing assembly depending upon the axial position of the gearbox sleeve relative to the coupling so that the coupling is automatically engaged or disengaged as the gearbox is respectively located in its operable position, or is withdrawn.

5 Claims, 2 Drawing Figures

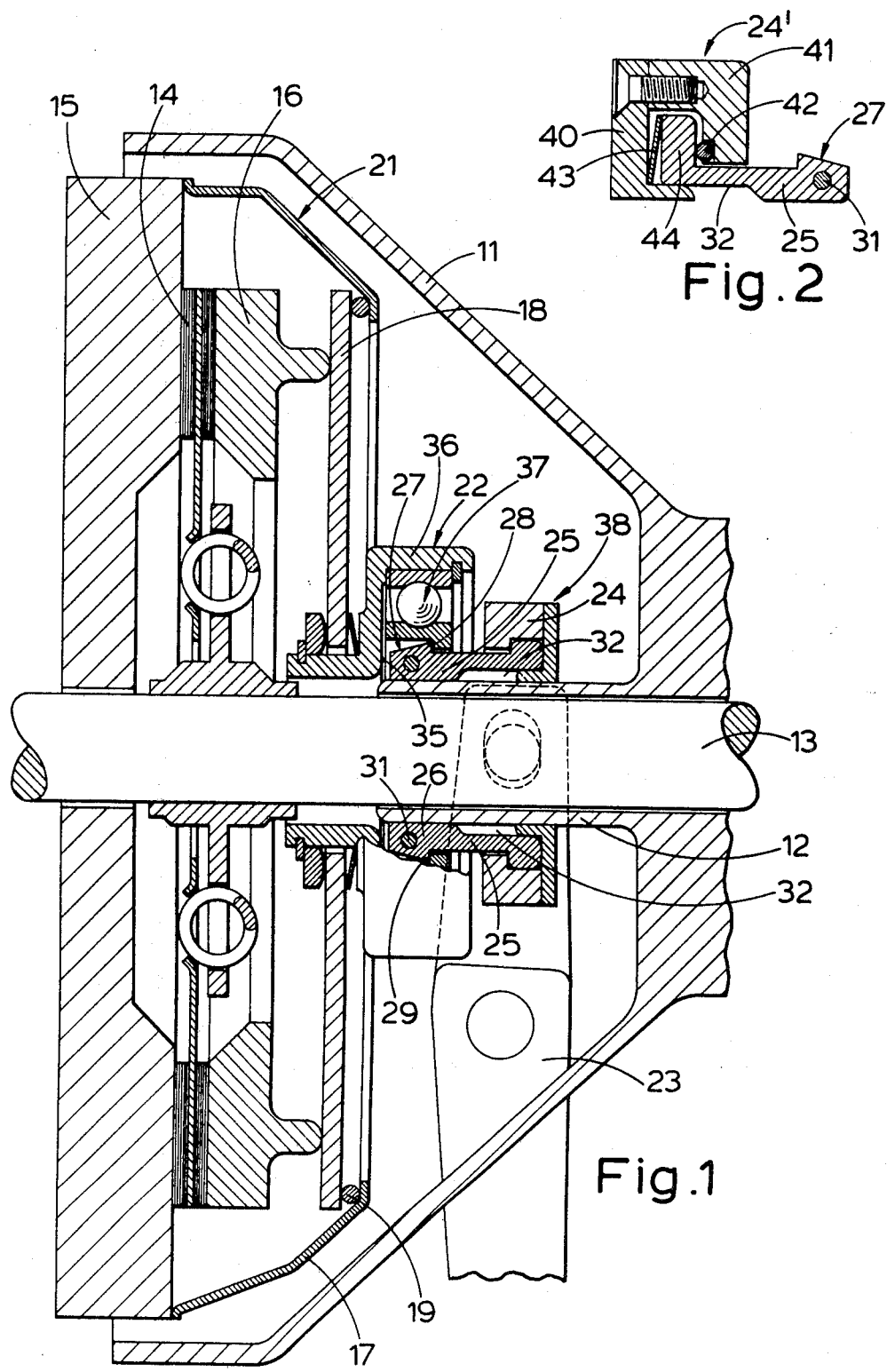

CLUTCH RELEASE MECHANISM FOR A PULL TYPE CLUTCH

This invention relates to a clutch release mechanism for pull type friction clutches of motor vehicles. A pull type friction clutch is one in which a clutch release bearing is moved along a guide away from a clutch driven plate to release the clutch.

Such mechanisms are frequently used for operating the friction clutches of motor vehicles and the guide is typically the motor vehicle gearbox input shaft or a sleeve surrounding the input shaft. A problem associated with pull type clutches is that, for example, with a diaphragm spring clutch the release bearing must be fitted to the centre of the diaphragm spring prior to fitting the gearbox in position. Since the clutch release fork is usually pivoted on the gearbox housing, and yet must engage with the release bearing fitted to the spring in order to be able to move the bearing away from the driven plate, it is sometimes difficult to feed the release fork into its operating position.

The herein disclosed invention provides a release mechanism in which the difficulties associated with feeding the fork lever into its operating position are alleviated.

Accordingly there is provided a clutch release mechanism for a pull type friction clutch of a motor vehicle transmission system having a gearbox with a sleeve surrounding the gearbox input shaft, said mechanism comprising a clutch release bearing assembly and a clutch release fork characterised in that the bearing assembly is operably connected to the release fork by an automatically connectable and disconnectable coupling which is caused to be engaged or disengaged with a shoulder on the bearing assembly depending upon the axial position of the sleeve relative to the coupling so that the coupling latches with the shoulder when the gearbox is in its operable position, and is automatically unlatched from the shoulder when the gearbox is withdrawn.

Preferably the coupling comprises a carrier ring for sliding on the sleeve, and a circumferential array of fingers pivoted to and arranged in use to extend axially from the carrier ring to the release bearing assembly, the free ends of the fingers each having a detent thereon for latching with the shoulder on the bearing assembly and having a spring biasing the finger in the unlatched position.

The invention will be described by way of example and with reference to the accompanying drawings in which:

FIG. 1 shows a cross-section through a bell housing of a gearbox in its operative position when fitted to a motor vehicle clutch; and FIG. 2 shows a section through a modified carrier ring.

An automobile gearbox housing 11 includes an axially projecting sleeve 12 that surrounds a gearbox input shaft 13. The input shaft 13 is driven by a friction clutch driven plate 14 sandwiched between the flywheel 15 of an internal combustion engine and a clutch pressure plate 16.

The pressure plate 16 is part of a clutch cover assembly 21 which includes an annular dished clutch cover 17 which houses the pressure plate 16, and a diaphragm spring 18 located between the cover 17 and the pressure plate to bias the pressure plate 16 towards the flywheel 15 to clamp the driven plate 14 therebetween.

The diaphragm spring 18 is of the usual frusto-conical construction having a continuous outer annular margin with a plurality of radially inwardly projecting fingers thereon. The outer periphery of the diaphragm spring 18 is pivoted to the cover 17 by a fulcrum ring 19, and the clamp load on the driven plate 14 is relieved by moving the inner ends of the fingers away from the driven plate 14. At the centre of the diaphragm spring 18, a clutch release bearing assembly 22 is attached to the radially inner ends of the spring fingers. The bearing assembly 22 is secured to the clutch cover assembly 21 prior to installation of the friction clutch against the flywheel 15.

The bearing assembly 22 comprises a cup shaped housing 36 attached to the diaphragm spring 18 and a rolling element bearing 37, the rotary race of which is secured within the housing 36 and the stationary race of which has a shoulder 29 thereon. The clutch driven plate 14 is released by operation of a clutch release fork 23 pivoted to the gearbox housing 11. The release fork 23 is connected to the release bearing assembly 22 by an automatically connectable and disconnectable link 38 formed from a carrier ring 24 which has pivoted thereto a circumferential array of at least three and preferably six, fingers 25 extending axially towards the driven plate 14. The fingers 25 each having a rounded end portion whereby they are pivoted to the carrier ring 24. The carrier ring 24 is pivotally attached to the release fork 23 and slides on the sleeve 12 and the free ends 26 of the fingers each have a radially outer chamfered face 27 with a detent 28 thereon. The detent 28 is engagable with the undercut shoulder 29 on the stationary inner race of the release bearing assembly 22. A garter spring 31 passing through the ends 26 of the fingers bunches the fingers radially inwards so that the detents 28 are biased so as not to engage the shoulder 29 on the bearing assembly 22.

The above arrangement makes it very simple to connect the release fork to the "pull type" release bearing assembly 22. The bearing assembly 22 will be in position on the flywheel 15 and the release fork 23 fitted to the gearbox and the carrier ring is in place on the end portion of the sleeve 12 away from the gearbox. The radially inner surfaces of each fingers 25 have an undercut 32 adjacent the carrier ring 24 so that when the ring 24 is fitted on to the end portion of the sleeve 12 the undercuts 32 allows the free ends 26 of the fingers 25 to be pulled inwards by the garter spring 31.

When the gearbox is offered upto the flywheel 15 the bunched fingers are moved freely past the shoulder 29 on the bearing assembly 22. This is helped by the chamfered faces 27 of each finger if the bunching of the fingers is not quite sufficient. Further movement causes the ends of the finger to abut a shoulder 35 on the housing 42 of the bearing assembly thereby holding the ring 24 and fingers 25 axially in position relative to the bearing assembly. Further movement of the gearbox towards the flywheel and into its operative position, causes the sleeve 12 to move relative to the now stationary carrier ring 24 and push the ends of the fingers radially outwards against the bias of the garter spring 31. When the clutch release mechanism is actuated the release fork 23 moves the carrier ring 24 so that the detents 28 on the finger then engage the undercut shoulder 29 on the bearing assembly 22.

When the gearbox is removed from its operative position the detent 28 engages the shoulder 29 to hold the carrier ring 24 in position relative to the bearing assembly. The sleeve 12 moves away from the driven plate 14 until the undercuts 32 align with the end of the sleeve. Thereafter movement of the gearbox away from the driven plate allows the fingers 25 to bunch together under the bias of the spring 31 until the detent 28 disengages from the shoulder 29. Thus the link between the release fork 23 and the bearing assembly 22 is disconnected and the gearbox can be withdrawn.

FIG. 2 shows a modified carrier ring 24' comprising two annular members 40 and 41 screwed together. The means whereby the fingers 25 are pivoted to the carrier ring 24' is modified from that in FIG. 1. A pivot ring 42 is located on the radially inner margin of the internal face of the member 41, and a Belleville spring washer 43 acts between the annular member 40 and those ends portions 44 of the fingers 25 enveloped within the carrier ring 24' to maintain the fingers against the pivot ring 42.

Any wear that takes place in the pivot ring 42 or at the pivot point on the fingers 26 is compensated by the gradual relaxation of the Belleville washer.

I claim:

1. A clutch release mechanism for a pull type friction clutch of a motor vehicle transmission system having a gearbox with a sleeve surrounding the gearbox input shaft and a clutch cover assembly, said mechanism comprising;

a clutch release bearing assembly secured to the clutch cover assembly and having a shoulder thereon;

a clutch release fork pivoted relative to the gearbox housing;

and a coupling means which connects the release fork to the bearing assembly, said coupling means being automatically connectable and disconnectable with the bearing assembly by engagement and disengagement, respectively, with the shoulder on the assembly depending upon the axial position of the sleeve relative to the coupling means, so that said coupling means automatically latches with said shoulder when the gearbox is in its operable position, and is automatically unlatched from said shoulder when the gearbox is withdrawn.

2. A release mechanism as claimed in claim 1, wherein the coupling means comprises a carrier ring for sliding on the sleeve, a circumferential array of fingers pivoted to and arranged in use to extend axially from the carrier ring to the release bearing assembly, a detent located at the free end of each of the fingers for latching with the shoulder on the bearing assembly, and a spring means biasing the fingers into an unlatched position.

3. A release mechanism as claimed in claim 2, wherein the spring means is a garter spring which bunches the ends of the fingers together.

4. A release mechanism as claimed in claim 2 or 3, wherein the radially outer surfaces of the fingers are chamfered so as to provide a lead-in for the detents with the shoulder of the bearing assembly.

5. A release mechanism as claimed in claim 2, wherein those end portions of the fingers pivoted to the carrier ring are enveloped therein, and are biased by a spring against a pivot ring so that as wear in the pivot ring and the fingers takes place the spring relaxes to maintain the fingers to the pivot ring.

* * * * *